United States Patent
Matsushiro et al.

[11] Patent Number: 5,267,184
[45] Date of Patent: Nov. 30, 1993

[54] APPARATUS AND METHOD FOR GENERATING A FIGURE BY SEQUENTIAL SEGMENT APPROXIMATION OF A PARAMETRIC CUBIC CURVE

[75] Inventors: Nobuhito Matsushiro; Ikuo Ooyake, both of Tokyo, Japan

[73] Assignee: Oki Electric Industry Co., Ltd., Tokyo, Japan

[21] Appl. No.: 411,441

[22] Filed: Sep. 22, 1989

[30] Foreign Application Priority Data

Sep. 30, 1988 [JP] Japan ................... 63-244280

[51] Int. Cl.⁵ .............................................. G06F 15/31
[52] U.S. Cl. ............................................... 364/718
[58] Field of Search ............... 364/718, 719, 720, 721

[56] References Cited

U.S. PATENT DOCUMENTS 4,760,548 7/1988 Baker et al. ..................... 364/718

OTHER PUBLICATIONS

William M. Newman "Principles of Interactive Computer Graphics", McGraw-Hill, pp. 326-329 (1979).

Primary Examiner—David H. Malzahn
Attorney, Agent, or Firm—Spencer, Frank & Schneider

[57] ABSTRACT

A figure generating apparatus for approximating in a rectangular coordinates system and by line segments a curve which is defined by a parametric cubic curve that includes a parameter, thereby generating a figure in the form of consecutive line segments. A calculator calculates, by using a distance evaluation formula, a distance between a midpoint of a line segment connecting one point of a curve and another point of the same curve which is defined by incrementing a parameter by a first predetermined value, and the maximum point representative of the maximum in a part of the curve which is associated with the line segment relative to the line segment. A shifter is loaded with a value produced by the calculator for shifting the value. A controller controls, when provided with the curve, the shifter such that the shifter shifts the value loaded therein to the greatest value which does not exceed a second predetermined value after the shift, and controls the calculator to determine a final increment of the parameter on the basis of the number of shifts executed by the shifter and the first predetermined value so as to determine a position of the other point in the rectangular coordinates system by using the determined increment. The controller determines the position of the other point of each of individual line segments in the rectangular coordinates system sequentially from the start point to the end point of the curve, and generates a figure on the basis of the determined positions.

7 Claims, 3 Drawing Sheets

APPARATUS AND METHOD FOR GENERATING A FIGURE BY SEQUENTIAL SEGMENT APPROXIMATION OF A PARAMETRIC CUBIC CURVE

BACKGROUND OF THE INVENTION

1. Field of the Invention

The present invention relates to an apparatus and a method for generating a figure and, more particularly, to an apparatus and a method for generating a figure of the kind which approximates the contour of a figure defined by a parametric cubic curve by use of segments of a straight line.

2. Description of the Prior Art

Generally, a display, printer or similar image output terminal renders a desired figure by using a curve whose rectangular coordinates are represented by a parameter t, e.g. a parametric cubic curve as typified by a Bezier curves or a spline curve. FIG. 2 shows an example of vector fonts. In FIG. 2, the curves each interconnecting crosses are the parametric cubic curves. One approach to approximate such a curve represented by a parametric cubic curve is recurrently subdividing a Bezier curve which is defined by four control points into two curve segments each being defined by four points, as taught by Newman, William M. in "PRINCIPLES OF INTERACTIVE COMPUTER GRAPHICS", McGraw-Hill, pp. 328-329 (1979) by way of example.

Specifically, as shown in FIG. 3A, assume a Bezier curve which is defined by four control points $P_0$, $P_1$, $P_2$ and $P_3$. Then, the above-mentioned approach divides the Bezier curve into two curve segments each being defined by four control points, as shown in FIG. 3B. As FIG. 3C indicates, the original Bezier curve is approximated by conjugate straight line segments each interconnecting the opposite ends of respective one of the curve segments. Such a subdividing technique is further effected with each of the curve segments recurrently until successive straight line segments having a desired degree of accuracy have been produced.

A Bezier curve stated above may be subdivided by the following procedure. Assume that the control points of the original curve are $P_i = (x_i, y_i)$ (where $i = 0$ to 3), and that the control points of the left half of the subdivided curve are $P'_i = (x'_i, y'_i)$, then control points $P'_0$ to $P'_3$ are produced by:

$P'_0 = P_0$ $P'_1 = P_0/2 + P_1/2$ $P'_2 = P_0/4 + P_1/2 + P_2/4$ $P'_3 = P_0/8 + 3P_1/8 + 3P_2/8 + P_3/8.$

This may be represented by a matrix:

$$\begin{bmatrix} 1 & 0 & 0 & 0 \\ 1/2 & 1/2 & 0 & 0 \\ 1/4 & 1/2 & 1/4 & 0 \\ 1/8 & 3/8 & 3/8 & 1/8 \end{bmatrix}$$

Likewise, the control points of the right half of the subdivided curve may be represented by a matrix:

$$\begin{bmatrix} 1/8 & 3/8 & 3/8 & 1/8 \\ 0 & 1/4 & 1/2 & 1/4 \\ 0 & 0 & 1/2 & 1/2 \\ 0 & 0 & 0 & 1 \end{bmatrix}$$

The prior art approximating method sequentially subdivides a Bezier curve recurrently starting at four control points, as discussed above. This brings about a problem that a so-called binary-tree data structure is constructed during the course of subdivision, resulting in the need for an extra work area and extra data supervision. Further, the binary-tree data structure is not readily adaptive to the processing for developing pixels in a raster memory of a raster device according to the order of scanning lines. The prior art method is, therefore, not feasible for a mode wherein the contour of a vector font is approximated by straight line segments and the inside of the resulting font area is sequentially painted out by scanning lines. With the prior art method, it is necessary that four different x coordinates representative of four control points have to be multiplied by a 4×4 matrix each, during every recurrent subdivision. A lot of calculations are also required for estimating the accuracy in the approximation. This kind of procedure involves a prohibitive number of recurrent subdivisions and, therefore, a prohibitive number of calculations, especially when a character font which inherently attaches much importance to the accuracy of approximation is to be drawn or generated.

SUMMARY OF THE INVENTION

It is therefore an object of the present invention to provide a method and an apparatus for generating a figure which, despite the use of the contour approximating principle, minimizes the extra work area needed therefor, simplifies the calculations to thereby enhance rapid processing, and well adapts itself to the processing for developing pixels according to the order of scanning lines.

In accordance with the present invention, a figure generating apparatus for approximating in a rectangular coordinates system and by line segments a curve which is defined by a parametric cubic curve that includes a parameter, thereby generating a figure in the form of consecutive line segments, has a calculator for calculating, by using a distance evaluation formula, a distance between a midpoint of a line segment connecting one point of a curve and another point of the same curve which is defined by incrementing a parameter by a first predetermined value, and the maximum point representative of the maximum in a part of the curve which is associated with the line segment relative to the line segment. A shifter is located with a value produced by the calculator for shifting the loaded value. A controller controls, when provided with the curve, the shifter such that the shifter shifts the value loaded therein to the greatest value which will exceed a second predetermined value after the shift, and controls the calculator to determine a final increment of the parameter on the basis of the number of shifts executed by the shifter and the first predetermined value so as to determine a position of the other point in the rectangular coordinates system by using the determined increment. The controller determines the position of the other point of each of individual line segments in the rectangular coordinates system sequentially from the start point to the end point of the curve, and generates a figure on the basis of the determined positions.

Also, in accordance with the present invention, a figure generating method for approximating, by using a processor which includes a memory, in a rectangular coordinates system and by line segments a curve which is defined by a parametric cubic curve that includes a parameter, thereby generating a figure in the form of consecutive line segments, prepares data representative of a curve in the memory. The processor calculates, by using a distance evaluation formula, a distance between a midpoint of a line segment connecting one point of a curve and another point of the same curve which is defined by incrementing a parameter by a first predetermined value, and the maximum point representative of the maximum in a part of the curve which is associated with the line segment relative to the line segment. The processor shifts a value of the calculated distance to the greatest value which does not exceed a second predetermined value. The processor determines a final increment of the parameter by using the number of shifts and the first predetermined value. The processor determines a position of the other point in the rectangular coordinates system by using the determined increment. The processor determines the position of the other point of each of line segments in the rectangular coordinates system sequentially from the start point to the end point of the curve. The determined position of the other point of each of the line segments is stored in the memory for generating a figure afterwards.

The criterion for determining the degree of approximation of a line segment to its associated curve segment is implemented as a distance between the midpoint of the line segment and the maximum point of the curve segment relative to the line segment. The calculator calculates an evaluation formula adapted for the evaluation of the distance. The resulting value is loaded in the shifter and sequentially shifted therein. The shift is equivalent to a change in the increment of the parameter which is the coefficient of the entire evaluation formula.

When the value produced by the shifts equals the maximum value which is not greater than a predetermined value, it is determined to be desired value. This value is calculated by using the number of shifts executed and a parameter increment assumed previously. Since the start point of the line segment has already been given, coordinates representative of the end point are determined based on the calculated parameter increment.

The above procedure is sequentially repeated with the individual line segments starting from the start point of the curve, thereby determining the coordinates of the individual line segments.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Briefly, in accordance with the present invention, a curve to be approximated is divided on the basis of a parameter of a parametric cubic curve, whereupon opposite ends of each curve segment are interconnected by a line segment or straight line segment as distinguished from the curve segment. The resulting conjugate straight line segments is approximate to the original curve.

Figure 4:
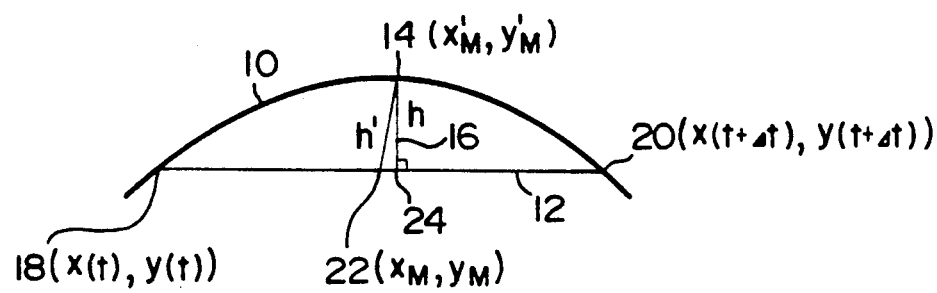
FIG. 4 is a diagram useful for describing a flatness evaluation formula associated with the embodiment of FIG. 1.

Referring to FIG. 4, there are shown a curve segment 10 having a maximum point 14, and a straight line segment 12 which is approximate to the curve segment 10. The degree of approximation of the straight line segment 12 to the curve segment 10 is determined on the basis of the length of a perpendicular 16 which is dropped from the maximum point 14 to the straight line segment 12. Division points 18 and 20 are sequentially set up such that a value of an evaluation formula associated with the length of the perpendicular 16 becomes smaller than a predetermined value (hereinafter referred to as a flatness value). The description, therefore, will begin with a formula for determining whether or not the length of the perpendicular 16 is smaller than the flatness value. In this sense, the formula will hereinafter be referred to as an evaluation formula.

Assume a curve to be approximated the coordinates (x(t), y(t)) of which are represented by a parametric cubic curve which is expressed as:

$$x(t) = ax t^3 + bx t^2 + cx t + dx \quad (1)$$

$$y(t) = ay t^3 + by t^2 + cy t + dy$$

where t is equal to or greater than 0 and equal to or smaller than 1.

Then, the curve segment 10 whose opposite ends 18 and 20 are located at coordinates (x(t), y(t)), (x(t+Δt), y(t+Δt)) will have a maximum point 14 which is expressed relative to the straight line segment 12, as follows:

$$(x'_M, y'_M) = \left( x\left(t + \frac{\Delta t}{2}\right), y\left(t + \frac{\Delta t}{2}\right) \right) \quad (2)$$

The equation (2) shown above will be described specifically. By differentiating x(t) and y(t) included in the equation (1), there are obtained:

$$x'(t) = 3ax t^2 + 2bx t + cx$$

$$y'(t) = 3ay t^2 + 2by t + cy.$$

Therefore, $$\left.\frac{dy}{dx}\right|_{t=t+\frac{\Delta t}{2}} \approx \frac{\begin{array}{c}3ayt^2(\Delta t) + 3ayt(\Delta t)^2 + \\ 2byt(\Delta t) + by(\Delta t)^2 \\ \hline 3axt^2(\Delta t) + 3axt(\Delta t)^2 + \\ 2bxt(\Delta t) + bx(\Delta t)^2 \\ +cy(\Delta t) \\ \hline +cx(\Delta t)\end{array}} \quad (3)$$

The equation (3) will be demonstrated as follows. Assuming that $(\Delta t)^3$ is negligibly small, then $$\left.\frac{dy}{dx}\right|_{t=t+\frac{\Delta t}{2}} = \frac{3ayt^2 + 3ayt(\Delta t) + 3ay\left(\frac{\Delta t}{2}\right)^2 + 2byt + by(\Delta t) + cy}{3axt^2 + 3axt(\Delta t) + 3ax\left(\frac{\Delta t}{2}\right)^2 + 2bxt + bx(\Delta t) + cx}$$

$$= \frac{3ayt^2(\Delta t) + 3ayt(\Delta t)^2 + \frac{3}{4}ay(\Delta t)^3 + 2byt(\Delta t) + by(\Delta t)^2 + cy(\Delta t)}{3axt^2(\Delta t) + 3axt(\Delta t)^2 + \frac{3}{4}ax(\Delta t)^3 + 2bxt(\Delta t) + bx(\Delta t)^2 + cx(\Delta t)}$$

If the terms $(\Delta t)^3$ are negligibly small, then the expression (3) is resultant from the above-identified equation.

On the other hand, the gradient of the straight line segment 12 is produed by:

$$\frac{y(t + \Delta t) - y(t)}{x(t + \Delta t) - x(t)} = \frac{\begin{array}{c}3ayt^2(\Delta t) + 3ayt(\Delta t)^2 + \\ 2byt(\Delta t) + by(\Delta t)^2 \\ \hline 3axt^2(\Delta t) + 3axt(\Delta t)^2 + \\ 2bxt(\Delta t) + bx(\Delta t)^2 \\ +cy(\Delta t) \\ \hline +cx(\Delta t)\end{array}} \quad (4)$$

From the equations (3) and (4), there is produced:

$$\left.\frac{dy}{dx}\right|_{t=t+\frac{\Delta t}{2}} \approx \frac{y(t + \Delta t) - y(t)}{x(t + \Delta t) - x(t)} \quad (5)$$

The equation (5) indicates that the straight line segment 12 is parallel to a tangential which passes through the point 14 of the curve segment 10 that is located at the coordinates $(x'M, y'M)$ and, therefore, the coordinates point 14 defines a maximum point of the curve segment 10 relative to the straight line segment 12. The equation (2) thus holds true.

By using the equation (2), the x coordinate of the maximum point 14 of the curve segment 10 relative to the straight line segment 12, i.e., the x coordinate $x'M$ of the approximate maximum point x is produced by:

$$x'_M = x\left(t + \frac{\Delta t}{2}\right)$$

$$= ax\left(t + \frac{\Delta t}{2}\right)^3 + bx\left(t + \frac{\Delta t}{2}\right)^2 +$$

$$cx\left(t + \frac{\Delta t}{2}\right) + dx$$

$$= ax\left\{t^3 + 3t^2\left(\frac{\Delta t}{2}\right) + 3t\left(\frac{\Delta t}{2}\right)^2 + \right.$$

$$\left.\left(\frac{\Delta t}{2}\right)^3\right\} + bx\left\{t^2 + 2t\left(\frac{\Delta t}{2}\right) + \left(\frac{\Delta t}{2}\right)^2\right\} +$$

$$cx\left(t + \frac{\Delta t}{2}\right) + dx$$

Let $(\Delta t/2)^3$ be neglected. Then, $$x'_M \approx 3axt^2\left(\frac{\Delta t}{2}\right) + 3axt\left(\frac{\Delta t}{2}\right)^2 + \quad (6)$$

$$2bxt\left(\frac{\Delta t}{2}\right) + bx\left(\frac{\Delta t}{2}\right)^2 + cx\left(\frac{\Delta t}{2}\right) + x(t)$$

Likewise, the y coordinate, i.e., the y coordinate $y'M$ of the approximate maximum point y is expressed as:

$$y'_M = y\left(t + \frac{\Delta t}{2}\right) \quad (7)$$

$$= 3ayt^2\left(\frac{\Delta t}{2}\right) + 3ayt\left(\frac{\Delta t}{2}\right)^2 + 2byt\left(\frac{\Delta t}{2}\right) +$$

$$by\left(\frac{\Delta t}{2}\right)^2 + cy\left(\frac{\Delta t}{2}\right) + y(t)$$

Assume that the distance between the maximum point 14 of the curve segment 10 relative to the straight line segment 12 and the midpoint 22 of the straight line segment 12 is h', and that the distance between the maximum point 14 and the point 24 of the straight line segment 12 which the perpendicular 16 extending from the maximum point 14 intersects is h. Then, a relation of $h \leqq h'$ constantly holds, as seen from FIG. 4.

It follows that if a relationship $h' < h_o$ holds between the distance h' and the given flatness value $h_o$, $$h \leqq h' \leqq h_o \quad (8)$$

Then, the degree of approximation can be determined by using the distance h' in place of the distance h.

The midpoint 22 of the straight line segment 12 has coordinates (xM, yM) which may be produced by:

$$x_M = \frac{x(t + \Delta t) + x(t)}{2}$$

$$= \frac{1}{2}\{ax(t + \Delta t)^3 + bx(t + \Delta t)^2 + cx(t + \Delta t) +$$

$$dx + axt^3 + bxt^2 + cxt + dx\}$$

$$= \frac{1}{2}[ax\{t^3 + 3t^2(\Delta t) + 3t(\Delta t)^2 +$$

$$(\Delta t)^3\} + bx\{t^2 + 2t(\Delta t) + (\Delta t)^2\} + cx(t + \Delta t) +$$

$$dx + axt^3 + bxt^2 + cxt + dx]$$

If $(\Delta t)^3$ is negligibly small, then $$x_M \approx \frac{3}{2}axt^2(\Delta t) + \frac{3}{2}axt(\Delta t)^2 + bxt(\Delta t) + \frac{1}{2}bx(\Delta t)^2 + \quad (9)$$

$$\frac{1}{2}cx(\Delta t) + x(t)$$

Likewise, $$y_M = \frac{y(t + \Delta t) + y(t)}{2} \quad (10)$$

$$\approx \frac{3}{2}ayt^2(\Delta t) + \frac{3}{2}ayt(\Delta t)^2 + byt(\Delta t) +$$

-continued $$\frac{1}{2} b y (\Delta t)^2 + \frac{1}{2} c y (\Delta t) + y(t)$$

From the equations (6), (7), (9) and (10), it will be seen that the distance h' has the following relationship:

$$h' \leq |x'_M - x_M| + |y'_M - y_M| \quad (11)$$
$$= \frac{1}{4} |(3ax t + bx)(\Delta t)^2| + \frac{1}{4} |(3ay + by)(\Delta t)^2|$$

By making the right side of the equation (11) equal to or smaller than the given flatness value $h_o$, a flatness evaluation formula is obtainable from the relation (8), as follows:

$$h \leq h' \leq \frac{1}{4} (|3ax t + bx| + |3ay t + by|)(\Delta t)^2 \leq h_0 \quad (12)$$

Figure 1:
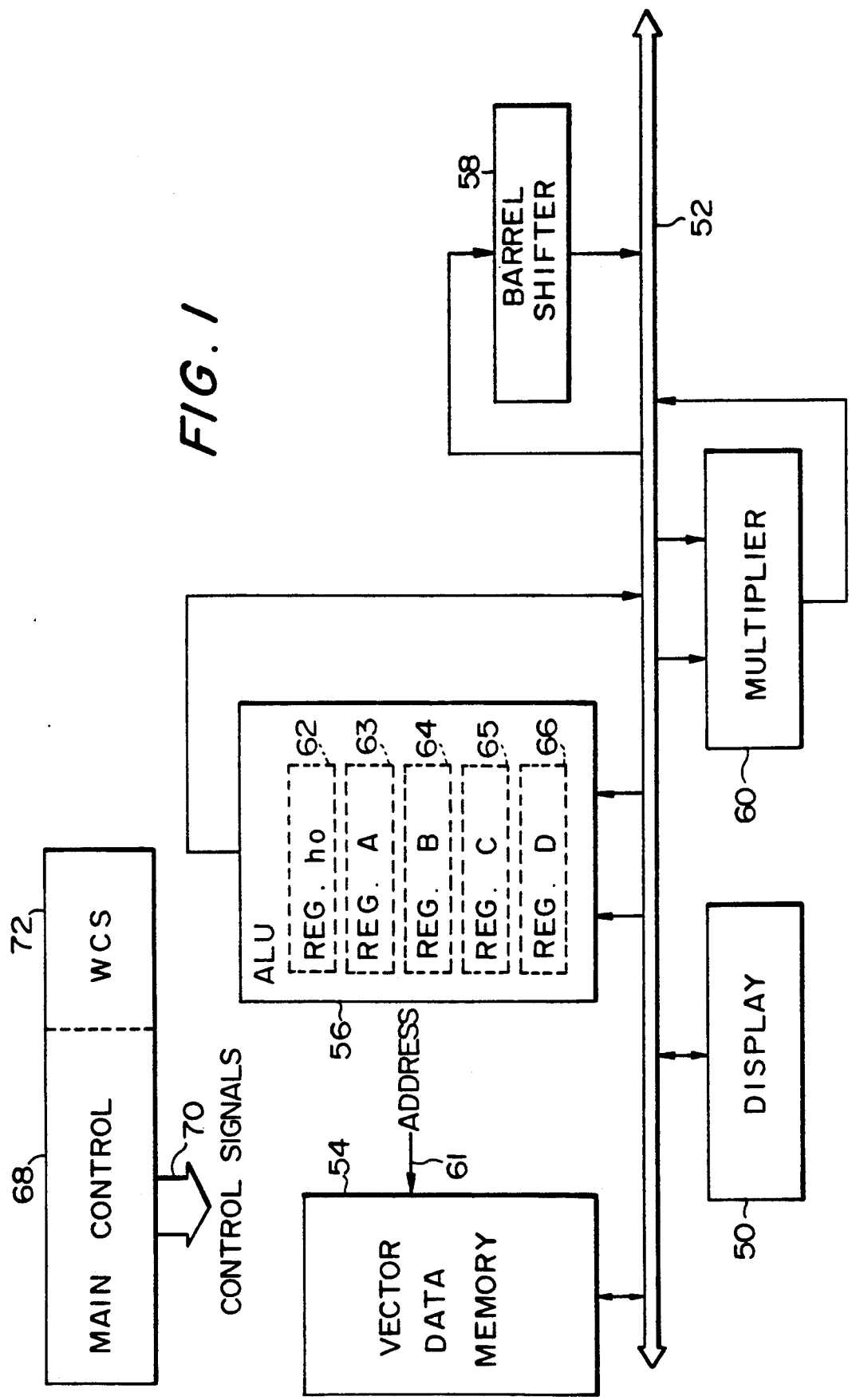
FIG. 1 is a block diagram schematically showing an embodiment of the figure generating apparatus in accordance with the present invention.
Figure 2:
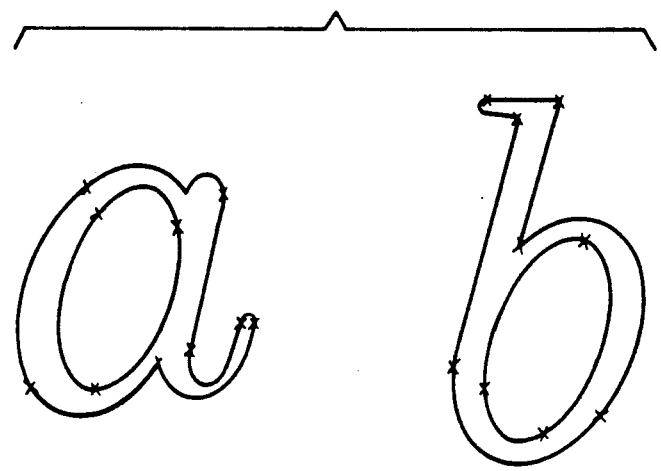
FIG. 2 shows an example of vector fonts which are represented by parametric cubic curves.
Figure 3A:
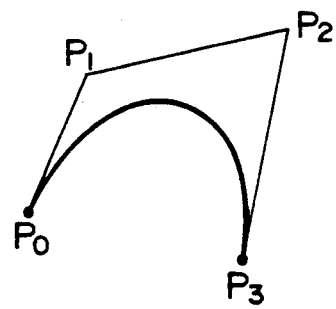
FIGS. 3A, 3B and 3C are diagrams useful for understanding the prior art contour approximating principle applicable to vector fonts.
Figure 3B:
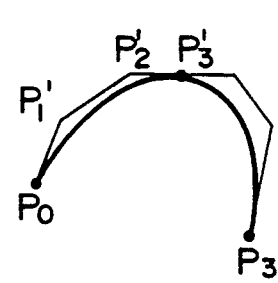
Figure 3C:
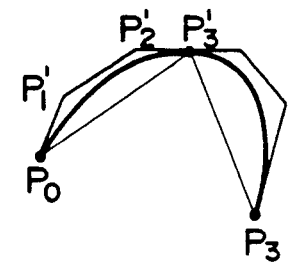

Referring to FIG. 1, a preferred embodiment of the figure generating apparatus in accordance with the present invention is shown which uses the flatness evaluation formula (12) discussed above. In the illustrative embodiment, the figure generating apparatus is of the type approximating the contour of a character font by straight line segments to generate font vectors and indicating the font vectors on a display 50. The display 50 may be comprised of a cathode ray tube or similar raster scan type display. The display 50 is connected to a data bus 52. Also connected to the data bus 52 are a vector data memory 54, an arithmetic and logical unit (ALU) 56, a barrel shifter 58, and a multiplier 60.

Comprising a RAM, the vector data memory 54 stores, for example, a coefficient of a parametric cubic curve which defines the contour of a font to be approximated, and vector data such as data representative of the resulting vector font. An operating area assigned to the operations of the ALU 56 is also provided in the vector data memory 54. The locations for storing such data are designated in terms of addresses which will be fed from a main control 68 to the vector data memory 54 over an address bus 61.

The ALU 56 performs arithmetic operations for generating a vector font by using the flatness evaluation formula (12). As shown in FIG. 1, the ALU 56 has five registers 62 to 66 and various kinds of arithmetic and logic operation circuits, not shown. In the illustrative embodiment, the multiplier 60 also joins in multiplication. The register 62 of the ALU 56 stores a given flatness value $h_o$, while the other registers 63 and 65 serve as a register A, a register B, a register C and a register D which individually hold intermediate values appearing during operations. More specifically, the registers 63 and 64 store respectively parameters i and $t_i$, while the registers 65 and 66 store respectively variables $\Delta t$ and $\Delta t_i$.

The barrel shifter 58 is implemented by a shift resister for holding data in successive register stages thereof and shifting those data either to the upper stages or to the lower stages sequentially. The amount and direction of shift to be effected by the barrel shifter 58 are commanded by the main control 68. The main control 68 generates control signals for controlling the various units of the apparatus. The control signals are distributed to the various units over control lines, as schematically indicated by the reference numeral 70. The main control 68 has a writable control storage (WCS) 72 which is loaded with, in the form of program sequences, processing sequences for approximating the contours of character fonts. The main control 68 executes approximation processing by controlling the various units on the basis of the processing sequences which are stored in the WCS 72.

Figure 5:
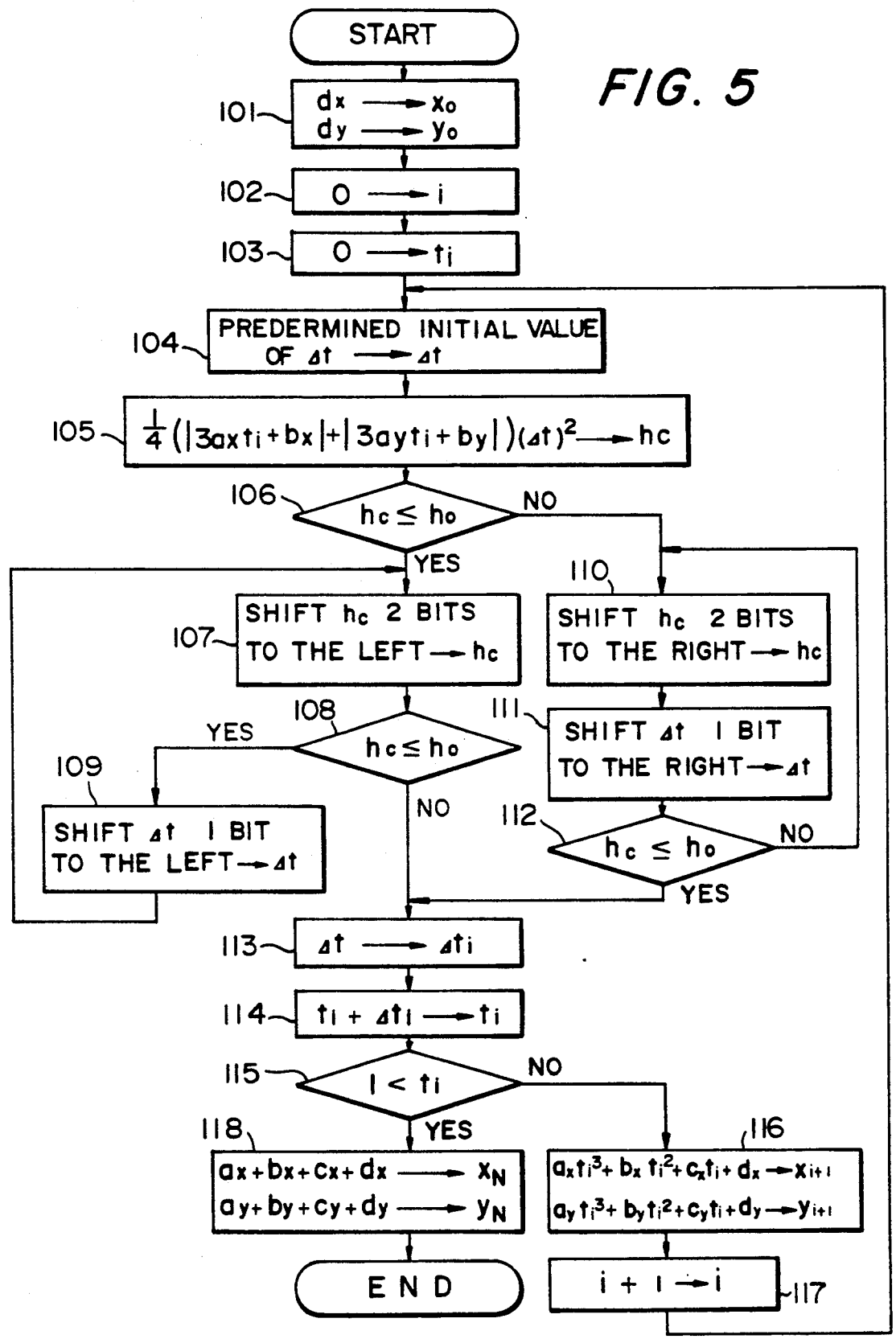
FIG. 5 is a flowchart demonstrating a sequence of contour approximating steps which the embodiment executes.

The operation of the embodiment shown in FIG. 1 will be described with reference to the flowchart of FIG. 5. The operation sequences to be stated are stored in the WCS 72 and executed by the main control 68.

The coefficients (ax, bx, cx, dx, ay, by, cy and dy) of parametric cubic curves which define the contours of fonts to be approximated are stored in the vector data memory 54 beforehand, while a predetermined flatness value $h_o$ is loaded in the register 62 of the ALU 56. The coordinates ($x_o$, $y_o$) of the start point of a curve are stored in a predetermined location of the vector data memory 54 (step 101, FIG. 5). The coordintes ($x_o$, $y_o$) are determined by substituting "0 (zero)" for t of the equation (1), the resulting values being dx, dy.

Thereafter, the registers A and B assigned to the parameters i and $t_i$, respectively, are individually loaded with "0" (steps 102 and 103). Here, $t_i$ is the parameter of a parametic cubic curve (i=0 to N−1; N being the number of divided curve segments and decided after the division processing) and is equal to or greater than "0" and equal to or smaller than "1" (where $t_o=0$ and $t_n=1$). The register C installed in the ALU 56 is loaded with a value which is set in the system beforehand as the initial value of $\Delta t$ (step 104).

In a step 105, by using the coefficient of a curve stored in the vector data memory 54 and $t_i$ and $\Delta t$ stored in the registers B and C, respectively, the ALU 56 and multiplier 60 calculate an equation:

$$h_0 = \frac{1}{4} (|3ax t_i + bx| + |3ay t_i + by|)(\Delta t)^2 \quad (13)$$

The result $h_c$ of the equation (13) is stored in the barrel shifter 58. Then, the ALU 56 determines which of the value $h_c$ and given flatness value $h_o$ is greater than the other and, if $h_c$ is equal to or smaller than $h_o$, it shifts the barrel shifter 58 by two bits to the left so as to increment $h_c$ (steps 106 and 107).

Subsequently, the ALU 56 again checks $h_c$ and $h_o$ as to their relation and, if $h_c$ is equal to or smaller than $h_o$, it saves $h_c$ loaded in the barrel shifter 58 in another location for a moment. After $\Delta t$ stored in the register C has been loaded in the barrel shifter 58 and then shifted by one bit to the left to be incremented, saved $h_c$ is reloaded in the register C. Thereafter, $h_c$ is set in the barrel shifter 58 again. Then, the program returns to the step 107 (steps 108 an 109).

The illustrative embodiment involves extra processing for saving $h_c$ as stated above, because the barrel shifter 58 bifunctions to shift $h_c$ and $\Delta t$. An exclusive barrel shifter may be assigned to respective one of $h_c$ and $\Delta t$ in order to eliminate the need for such extra processing and thereby to further reduce the processing time. This is also true with a step 111 which will be described.

The sequence of steps 107, 108 and 109 is repeated until the ALU 56 decides that $h_c$ is not equal to or smaller than $h_o$ in the step 108. When $h_c$ is not equal to or smaller than $h_o$ as decided in the step 108, the program advances to a step 113. At this time, $\Delta t$ stored in register C assumes the greatest value which can maintain $h_c$ equal to or smaller than $h_o$, and it is $\Delta t \cdot 2^{ni}$ (where 2·ni is the number of left shifts and Δt, the value set in the step 104).

When $h_c$ is not equal to or smaller than $h_o$ as decided in the step 106, the barrel shifter 58 is shifted by two bits to the right to thereby decrement $h_c$ (step 110). Subsequently, $h_c$ stored in the barrel shifter 58 is saved in another location for a moment, Δt stored in the shift register C is set in the barrel shifter 58 and then shifted by one bit to the right to be decremented, and then the saved $h_c$ is reloaded in the register C (step 111). The ALU 56 checks the two values $h_c$ and $h_o$ as to their relation and, if $h_c$ is not equal to or greater than $h_o$, the program returns to the step 110 (step 112).

The consecutive steps 110, 111 and 112 stated above are repeated until the ALU 56 determines that $h_c$ is equal to or smaller than $h_o$. If $h_c$ is equal to or smaller than $h_o$ as decided in the step 112, the step 112 is followed by a step 113. At this instant, Δt stored in the register C assumes the greatest value which can maintain $h_c$ equal to or smaller than $h_o$, and it is $\Delta t \cdot 2^{-ni}$ (where 2·ni is the number of right shifts and Δt, the value set in the step 104).

When the ALU 56 decides that $h_c$ is not equal to or smaller than $h_o$ in the step 108, i.e., that Δt has already reached the greatest value which can maintain $h_c$ equal to or smaller than $h_o$ in the immediately preceding step, or when it decides that $h_c$ is equal to or smaller than $h_o$ in the step 112, $\Delta t_i$ is loaded in the register C and set in the register D of the ALU 56 (step 113). It is to be noted that the value $\Delta t_i$ is representative of the increment as measured from the parameter value $t_i$ of the start point $(x_i, y_i)$ to the parameter value $t_{i+1}$ of the end point $(x_{i+1}, y_{i+1})$. There holds a relationship $t_{i+1} = t_i + \Delta t_i$.

The ALU 56 adds $t_i$ stored in the register B and $\Delta t_i$ stored in the register D, and then it updates $t_i$ of the register B by the resulting sum (step 114). If desired, an arrangement may be made such that $\Delta t_i$ of the register D used for the addition is replaced with Δt of the register C in order to omit the register D.

The ALU 56 determines whether $t_i$ of the register B is greater than "1" or not and, if the former is not greater than the latter, the program advances to a step 116 (step 115). In the step 116, the ALU 56 and multiplier 60 calculates the coordinates $(x_{i+1}, y_{i+1})$ associated with the parameter $t_i$ by using the equation (1), storing the result in a predetermined location of vector data memory 54 (step 116). Then, the ALU 56 adds "1" to i of the register A and updates the register A by the resulting (i+1) (step 117). The value i of the register A may be used to designate a particular location of the vector data memory 54 where the coordinates calculated in the step 116 should be stored. The consecutive steps 104 to 117 are repeated thereafter until $t_i$ becomes greater than "1" as decided in the step 115. By the procedure described so far, the coordinates of individual straight line segments are determined one after another.

When $t_i$ is greater than "1" as decided in the step 115, i.e., when all the coordinates of the curve except for those of the end point are determined, the ALU 56 and multiplier 60 calculate the coordinates $(x_n, y_n)$ of the end point by using the equation (1) and store the result in a predetermined location of the vector data memory 54 (step 118).

By the sequence of steps described above, the coordinates of the individual straight line segments for the approximation of the curve are sequentially determined and stored in the vector data memory 54. The resulting coordinates stored in the vector data memory 54 as stated may be read out of the memory 54 to show the curve or only a particular part of the curve on the display 50.

While the present invention has been shown and described in relation to the approximation of the contour of vector fonts only, it is similarly applicable to other various kinds of figures which are defined by parametric curves.

In summary, in accordance with the present invention, a parametric cubic curve is approximated by straight line segments in order with respect to a parameter. This frees the approximation processing from a complicated data structure and, therefore, eliminates an extra operating area otherwise needed therefor. Since a parameter increment is the coefficient of the entire flatness evaluation formula, it is possible to determine a parameter increment which satisfies a flatness evaluation criterion, rapidly by using a barrel shifter. Further, a major part of the calculations necessary for the approximation by straight line segments is associated the evaluation of the flatness evaluation formula, i.e., the approximation itself does not need matrix operations or similar complicated operations, enhancing high-speed processing. It will be seen that the present invention is extensively applicable to exclusive LSIs for the approximation of vector font contours which relies on straight line segments.

While the present invention has been described with reference to the particular illustrative embodiment, it is not to be restricted by the embodiment but only by the appended claims. It is to be appreciated that those skilled in the art can change or modify the embodiment without separating from the scope and spirit of the present invention.

What is claimed is:

1. A figure generating apparatus for approximating in a rectangular coordinates system and by line segments, a curve which is defined by a parametric cubic curve that includes a parameter, thereby generating a figure in the form of consecutive line segments, comprising:

calculating means for calculating, by using a distance evaluation formula, a distance between a midpoint of a line segment connecting one point of a curve and an other point of said curve which is defined by incrementing a parameter by a first predetermined value, and a maximum point representative of the maximum in a part of said curve which is associated with the line segment relative to the line segment;

shifting means loaded with a value resultant from the distance calculated by said calculating means for shifting the loaded value; and control means for controlling said calculating means and said shifting means;

said calculating means being adapted to determine, under the control of said control means, a final increment of the parameter on the basis of the number of shifts executed by said shifting means and the first predetermined value so as to determine a position of the other point in the rectangular coordinates system by using said determined increment;

said control means being adapted to control, when provided with said curve, said shifting means to shift the values loaded therein to the greatest value which will not exceed a second predetermined value after the shift;

said control means being adapted to determine the position of the other point of each individual line segment in the rectangular coordinates system sequentially from a start point to an end point of the curve, and generate a figure on the basis of the determined positions;

said apparatus further comprising visualizing means operative in response to said control means for visualizing the figure generated.

2. An apparatus in accordance with claim 1 wherein the control means includes a memory for storing the determined position of the other point of each of the line segments.

3. An apparatus in accordance with claim 2 wherein the memory is a random access memory.

4. An apparatus in accordance with claim 1 wherein the distance evaluation formula includes the increment of the parameter as a coefficient to be used for entire portions of the distance evaluation formula.

5. An apparatus in accordance with claim 4, wherein assuming that a position of the curve in the rectangular coordinates system is represented by a value (x(t), y(t)), and that x(t) and y(t) are expressed as:

$$x(t) = ax t^3 + bx t^2 + cx t + dx$$

$$y(t) = ay t^3 + by t^2 + cy t + dy$$

where t is a parameter which is 0 to 1, inclusive, the distance evaluation formula is:

$$(|3ax t_i + bx| + |3ay t_i + by|)(\Delta t)^2 / 4$$

where $\Delta t$ is an increment of the parameter.

6. An apparatus in accordance with claim 1, wherein said shifting means comprises a barrel shifter a shifting direction of which is selectively variable toward upper bits and lower bits in response to said control means.

7. An apparatus in accordance with claim 1, wherein the curve renders a contour of a character font, said apparatus further comprising rendering means for rendering the generated figure in a character font.

* * * * *